UNITED STATES PATENT OFFICE 2,135,259

ESTERS OF HIGH MOLECULAR WEIGHT

Heinrich Neresheimer and Anton Vilsmeier, Ludwigshafen-on-the-Rhine, Germany, and Karl Heymann, Akron, Ohio, assignors to General Aniline Works, Inc., New York, N. Y., a corporation of Delaware No Drawing. Application February 20, 1937, Serial No. 126,804. In Germany March 4, 1936

5 Claims. (Cl. 260—353)

The present invention relates to esters of high molecular weight.

We have found that esters of high molecular weight of the general composition $(R.COO)_n$—X wherein R stands for a radical of high molecular weight with a straight or branched alkyl group or a hydroaromatic radical containing at least 6 carbon atoms, $n$ for a whole number and X for the radical of a cyclic compound having at least three condensed nuclei, may be used with advantage for a series of various industrial purposes.

Esters of the said kind may be prepared by causing cyclic compounds having at least three condensed nuclei and containing at least one hydroxyl group to react in the presence of condensing agents with carboxylic acids of high molecular weight in which the carboxylic group is attached to a radical R having the above significance, or by causing the said cyclic compounds to react with esterifying derivatives of such acids.

The radical R of high molecular weight should contain 6 or more carbon atoms. R may thus be a cyclohexyl radical, the radical of a hydronaphthalene or of a hydroanthracene, whereby these radicals may also be attached to the carboxylic group by way of an open carbon chain, and also a straight or branched alkyl group with more than six carbon atoms, for example heptyl, nonyl, undecyl, heptadecyl and heptadecenyl radicals. Finally R may also be the radical of a compound of the terpene series or a similarly composed hydroaromatic compound, as for example a bornyl, camphene, camphane, naphthenyl or abietinyl radical.

As cyclic compounds having at least three condensed nuclei and containing hydroxyl groups may be mentioned for example hydroxy compounds of the anthracene, anthraquinone, phenanthrene, phenazine, pyrene, chrysene, perylene, benzperylene, triphenylene, benzanthrene, benzanthrone, anthrapyrimidine, anthradipyrimidine, anthrapyridone, coeramidonine, coeroxene and coerhiene series. Compounds of the said series may also be used which under suitable reaction conditions, as for example in the presence of reducing agents, behave as hydroxyl compounds. As compounds of this kind there may be mentioned in particular compounds having cyclic-combined carbonyl groups.

When the said carboxylic acids are caused to react as such with the hydroxy compounds, a condensing agent is used. For this purpose there may be mentioned sulphuric acid or other water-extracting agents, as for example anhydrous zinc chloride, anhydrous aluminium chloride or phosphorus pentoxide. It is preferable to start with derivatives of the carboxylic acids which have an esterifying action, as for example their halides or anhydrides.

By using polyhydroxy compounds it is also possible to prepare final products which contain the radical R.COO— more than once in the molecule. It is also possible to start with carboxylic acids or their esterifying derivatives which contain one or more carboxylic groups in the radical R. In this case it is possible also to obtain compounds in which several carboxyl groups in the aliphatic or cycloaliphatic polycarboxylic acid are esterified with the said compounds having at least three nuclei, whereby these radicals may also differ from each other.

The reaction may be effected in many cases merely by simple heating of the initial materials. Generally speaking, however, it is carried out in the presence of solvents or diluents, as for example hydrocarbons, or secondary or tertiary amines. When selecting the diluent, care should naturally be taken when using the free carboxylic acid and a water-extracting agent that it does not take part in the reaction. In many cases it is preferable to carry out the reaction in a closed vessel, if desired while forcing in gases which do not impair the reaction.

The new esters are generally speaking obtained in good yields. If necessary they may be purified by the usual methods, as for example by dissolution, crystallization and in many cases also by sublimation. Generally speaking the compounds may dissolve very well in hydrocarbons and other water-insoluble organic substances. They are almost all colored. The solutions of some of them have a vivid fluorescence so that they may be used with advantage for coloring and/or rendering fluorescent artificial resins of a great variety of kinds, hydrocarbons, paraffin waxes, oils, waxes, fats, mineral oils, rubber and other natural and synthetic plastic masses as well as lacquers. They are also suit-

Example 1

1 part of Bz2-monohydroxydibenzanthrone is stirred with 1 part of stearic acid chloride and 10 parts of pyridine until a sample withdrawn dissolves completely in benzene giving a violet colouration. The resulting compound is then filtered off by suction and washed with methanol. It is a brown-black powder which dissolves for example in paraffin oil giving a violet coloration with a red fluorescence.

Example 2

A mixture of 18 parts of Bz2,Bz2'-dihydroxydibenzanthrone, 28 parts of stearic acid chloride, 8 parts of pyridine and 100 parts of monochlorbenzene is heated to boiling until a red-violet solution has been formed. The mass is then treated with steam and the remaining black-brown dyestuff is washed with hot alcohol. It dissolves readily for example in olive oil giving a red-violet coloration and a brilliant red fluorescence.

Similar substances are obtained by using other halides of high molecular aliphatic or hydroaromatic acids, as for example oleic acid chloride, halides of the acids contained in palm kernel oil or naphthenic acids instead of stearic acid chloride.

Example 3

36 parts of stearic acid chloride are added at from 25° to 30° C. while stirring to a suspension of 5 parts of Bz2,Bz2',Bz3-trihydroxydibenzanthrone in 50 parts of pyridine, the mixture being stirred for 20 hours at about 20° C. The mixture is then poured into a large volume of dilute hydrochloric acid, the soft dark mass thus precipitated filtered off by suction and washed with water. The free stearic acid formed from the excess of stearic acid chloride used is removed with alcohol, whereby a dark violet-tinged wax-like mass remains which is soluble very readily in benzene, benzine and various mineral oils giving a red-violet coloration and a strong yellow-red fluorescence.

If the reaction, instead of being carried out at 20° C. be carried out for 5 hours at 80° C. and the product worked up in the said manner, a dark soft mass, also very readily soluble in oils, is obtained which dissolves in hydrocarbons giving a yellow-red coloration with a yellowish-olive fluorescence.

Example 4

A mixture of 5 parts of Bz2,Bz2',Bz3-trihydroxydibenzanthrone, 100 parts of ortho-dichlorbenzene and 36 parts of stearic acid chloride is heated to 180° C. while stirring for about 3 hours and poured, after cooling, into methanol. A dark oil thus separates which solidifies to a dark powder after washing with methanol. It is soluble in benzene, ligroin and paraffin oil very readily giving a red coloration.

If 5 parts of Bz2,Bz2',Bz3,Bz3'-tetrahydroxydibenzanthrone be used instead of Bz2,Bz2',Bz3-trihydroxydibenzanthrone, a compound having very similar properties is obtained.

Example 5

A mixture of 5 parts of Bz3-amino-Bz2,Bz2'-dihydroxydibenzanthrone, 36 parts of stearic acid chloride and 50 parts of pyridine is heated at 80° C. for 5 hours while stirring. A deep red-violet solution is thus formed which is poured into methyl alcohol after cooling. A violet-tinged dark oil thus separates which after washing with hot alcohol solidifies to a deep violet wax-like mass. It is very readily soluble in paraffin oil giving a violet-tinged red coloration; it imparts a vivid yellow-red fluorescence to the paraffin oil.

If the reaction be carried out for 20 hours at from 20° to 25° C. instead of at 80° C., a substance is obtained which also dissolves very readily in paraffin oil. The color of the solution is red-violet and the fluorescence is yellow-red. If the initial mixture be heated for 7 hours at from 125° to 130° C., there is obtained after working up a substance which is also readily soluble in paraffin oil giving a reddish orange coloration and an olive-tinged yellow fluorescence.

Example 6

A mixture of 5 parts of Bz3-amino-Bz2,Bz2'-dihydroxydibenzanthrone, 36 parts of stearic acid chloride and 100 parts of trichlorbenzene is heated to boiling in the course of 3 hours and then stirred for 2 hours at the boiling temperature. After cooling, undissolved matter is filtered off by suction and the filtrate is poured into methanol, whereby a dark oily mass is precipitated which rapidly becomes solid and which is filtered off by suction and washed with methanol. After drying it melts toward 100° C. to a viscous oil which becomes solid again on cooling. It is very readily soluble in oils and imparts for example to paraffin oil a red color very stable to light and a strong olive-green fluorescence.

If Bz3,Bz3'-diamino-Bz2,Bz2'-dihydroxydibenzanthrone be used instead of Bz3-amino-Bz2,Bz2'-dihydroxydibenzanthrone, a substance of very similar properties is obtained which is also very readily soluble in oils.

Example 7

5 parts of para-formaldehyde are added to a solution of 5 parts of Bz2,Bz2',Bz3-trihydroxydibenzanthrone in 100 parts of concentrated sulphuric acid, the mixture being heated to 50° C. and kept at the said temperature for an hour. It is then poured into water, whereby a violet precipitate is deposited. It is filtered off by suction, washed with water and dried. The compound thus obtained is treated in the manner described in the first paragraph of Example 6 with stearic acid chloride in the presence of pyridine at 80° C. A dark mass is obtained which is very suitable for example for coloring paraffin oil. It imparts to the latter a violet-tinged red coloration and a brown-olive fluorescence.

Example 8

36 parts of stearic acid chloride are added at from 20° to 25° C. to a suspension of 5 parts of Bz3-hydroxy-dibenzanthrone-Bz2,Bz2'-quinone (obtainable by the oxidation of Bz2,Bz2',Bz3-trihydroxydibenzanthrone with the calculated amount of sodium nitrite in the presence of dilute sulphuric acid) in 50 parts of pyridine, the mixture being then stirred for 20 hours at the said temperature and worked up in the manner described in the first paragraph of Example 3. The substance thus obtained has properties similar to those of the substance obtainable according to the first paragraph of Example 3.

Example 9

31 parts of Bz2,Bz2'-dihydroxyisodibenzanthrone, 50 parts of lauric acid chloride and 40 parts of pyridine are stirred at 50° C. until a sample withdrawn dissolves completely in benzene giving a red-violet coloration. The compound formed is then separated by the addition of methanol and boiled with alcohol. A brown-black powder is thus obtained which dissolves for example in fused beeswax giving a violet coloration and an orange fluorescence. Upon cooling the wax becomes violet.

Example 10

A mixture of 1 part of dihydroxyperylene tetracarboxylic acid di-imide, 3 parts of oleic acid chloride and 10 parts of pyridine is heated for from 1 to 2 hours at about 100° C. By adding hot alcohol, the dyestuff is precipitated. It is a brown-black powder which dissolves in paraffin oil giving a rose coloration and a yellow fluorescence.

Similar substances are obtained by starting from dihydroxy-perylene tetracarboxylic acid imides the imino hydrogen of which is replaced.

Example 11

From 2 to 3 parts of zinc dust are introduced at about 30° C. into a mixture of 50 parts of pyridine, 5 parts of Bz2,Bz2'-dihydroxydibenzanthrone, and 36 parts of stearic acid chloride, and the whole is heated to 80° C. and kept at this temperature until a sample withdrawn has become readily soluble in paraffin oil giving a reddish yellow coloration. After cooling, the mass is poured into methanol and the separated viscous red oil is washed with hot alcohol, whereby it gradually becomes solid. It dissolves in paraffin oil very readily giving a red-yellow coloration and a vivid yellow-olive fluorescence.

Example 12

10 parts of stearic acid chloride are allowed to flow while stirring well into a vat prepared at 40° C. from 5 parts of dibenzanthrone with 7 parts of 35 per cent caustic soda solution and 5 parts of hydrosulphite in 50 parts of water. The immediately precipitated ester is filtered off after cooling and purified by boiling with alcohol. It may be separated from any dibenzanthrone still present for example by dissolution in and precipitation from cyclohexane. It dissolves in paraffin oil giving a yellow-red coloration and an olive-green fluorescence.

Example 13

A mixture of 100 parts of trichlorbenzene, 5 parts of commercial dibenzanthrone and 36 parts of stearic acid chloride is heated to boiling for about 1½ hours. After cooling, the resulting compound is filtered off by suction, and washed with methanol. It is a red-brown powder which is readily soluble in paraffin oil giving a yellow coloration and an olive-yellow fluorescence. It dissolves in concentrated sulphuric acid giving a blue coloration. By pouring the filtrate into methanol, a violetish dark substance is obtained which is at first oily but becomes solid after boiling with alcohol. It is very readily soluble in paraffin oil giving a brown-orange coloration and an olive-green fluorescence. It dissolves in concentrated sulphuric acid giving a turbid blue coloration.

If 5 parts of isodibenzanthrone be used instead of 5 parts of dibenzanthrone, there is obtained after filtering off by suction a substance readily soluble in paraffin oil giving a red coloration and an olive-yellow fluorescence as the residue and from the filtrate there may be obtained by precipitation with methanol a substance very readily soluble in paraffin oil giving a red-violet coloration and a brown-olive fluorescence.

Example 14

A mixture of 5 parts of benzanthrone, 50 parts of trichlorbenzene and 18 parts of stearic acid chloride is heated to boiling until a sample withdrawn and precipitated with methanol dissolves in paraffin oil very readily to give a strong olive-green fluorescence. The mixture is then allowed to cool and the deep yellow colored solution is poured into methanol, whereby a resinous mass is precipitated which is washed with hot alcohol. The substance thus obtained dissolves in an excellent manner in oils, as for example in paraffin oil, to which it imparts a reddish yellow coloration with a very powerful olive-green fluorescence.

The reaction may also be carried out at lower temperatures, as for example in boiling monochlorbenzene. Substances are then obtained which dissolve in paraffin oil giving a clearer color and fluorescence. Similarly substances which usually yield solutions of clearer color and fluorescence are also obtained when the reaction is carried out in the presence of organic bases, such as diphenylamine or alkyldiphenylamines.

Instead of benzanthrone, the initial material may also be its derivatives, as for example 6-methylbenzanthrone, 2 - chlorbenzanthrone or Bz1-brombenzanthrone, substances of similar properties being obtained.

Example 15

A mixture of 11.5 parts of benzanthrone, 18 parts of stearic acid chloride and 60 parts of methyldiphenylamine is heated at from 150° to 170° C. for 4 hours. After cooling, it is poured into methanol. The substance which separates in compact brownish crystals on standing is worked up in the usual manner. It dissolves in paraffin oil giving a yellow coloration and an olive-yellow fluorescence.

Example 16

A mixture of 4.5 parts of benzanthronepyrazolanthrone, 1.3 parts of zinc dust, 9 parts of stearoyl chloride and 50 parts of pyridine is heated at 100° C. until the greater part of the dyestuff has passed into solution, filtered by suction while hot and the ester formed precipitated with alcohol. It dissolves in paraffin oil giving a red-violet coloration and a yellow-red fluorescence.

Example 17

A mixture of 8 parts of pyranthrone, 160 parts of trichlorbenzene, 15 parts of stearoyl chloride, 4 parts of pyridine and 2 parts of zinc dust is heated to boiling for half an hour, the undissolved dyestuff then filtered off and the ester formed filtered off by suction after cooling and adding a little methanol to the filtrate. The ester dissolves in paraffin oil giving a yellow coloration and a yellow-green to blue-green fluorescence depending on the amount.

Example 18

15 parts of stearic acid chloride are allowed to drop into a suspension of 10.8 parts of 1,4-di-paratoluido-8-hydroxy-anthraquinone in 50 parts of pyridine, the mixture then being heated at 110° C. until crystals no longer separate from a cooled sample. After cooling the deep green-blue solution is poured into an excess of dilute hydrochloric acid whereby a powerful green-blue semisolid substance is precipitated which is washed with water and dried. It is very readily soluble in most organic solvents, as for example in butyl acetate, giving a green-blue coloration.

Example 19

Zinc dust is introduced at from 20° to 35° C. while stirring vigorously into a mixture, prepared while cooling, of 50 parts of pyridine, 10.4 parts of 1,4-di-para-toluidoanthraquinone and 30 parts of stearic acid chloride until the color of the solution has changed from blue-green to olive. The zinc sludge is filtered off and the filtrate poured into an excess of dilute hydrochloric acid. A dark semisolid mass is thus precipitated which is washed with warm alcohol. It is readily soluble in most organic solvents, as for example in paraffin oil giving an olive-green coloration and a strong blue-green fluorescence.

Example 20

15 parts of stearic acid chloride are introduced at from 20° to 30° C. into a suspension of 8.2 parts of 1-paratoluido-4-hydroxyanthraquinone in 50 parts of pyridine. The mixture is stirred for about 3 hours at 30° C., heated to 105° C. and kept at the said temperature until a sample withdrawn dissolves in butyl acetate to give a clear violet coloration. After cooling, any residue is filtered off and the filtrate is poured into an excess of dilute hydrochloric acid whereby a dark red waxy substance is precipitated which is filtered off by suction, washed with water and dried. It is very readily soluble for example in butyl acetate giving a violet coloration.

Example 21

A mixture of 50 parts of pyridine, 7 parts of 1,4-dihydroxy-ethyldiaminoanthraquinone and 15 parts of stearic acid chloride is heated for about an hour at 110° C. The deep blue solution is filtered by suction while still hot and the filtrate poured into an excess of dilute hydrochloric acid, whereby a dark blue waxy substance is precipitated which is washed with water and dried. It is readily soluble in most organic solvents giving a deep blue coloration and is eminently suitable for coloring benzines, oils, lacquers and similar substances.

If 11.2 parts of 1,4-dihydroxyethyldiamino-5.8-dihydroxyanthraquinone be used instead of 1.4-dihydroxydiaminoanthraquinone, a compound is obtained which is soluble in most organic solvents giving a green-blue coloration.

Example 22

A mixture of 11 parts of N-dihydro-1,2,2',1'-anthraquinoneazine and 60 parts of stearic acid chloride is heated at 200° C. for several hours while stirring. It is then allowed to cool to 80° C., is diluted with about 400 parts of benzene, freed by filtration by suction from undissolved matter while still hot, the benzene evaporated and the residue boiled with alcohol. A dark resinous substance is thus obtained which dissolves very readily in benzene, benzine, paraffin oil, butyl acetate, paraffin wax, waxes and similar organic substances giving a violet-tinged red coloration.

Example 23

6.2 parts of 2-hydroxy-1,9-anthrapyrimidine are introduced into a mixture of 20 parts of stearic acid chloride and 30 parts of trichlorbenzene and the mixture heated at about 200° C. until a sample withdrawn and dissolved in benzene has a strong olive-green fluorescence. The trichlorbenzene is then removed by means of steam and the dark residue extracted with benzene. By concentrating the solution, a brown finely crystalline residue is obtained which is filtered off by suction and dried. It dissolves readily in benzene or paraffin oil giving a pale yellow coloration and strong olive-green fluorescence. The color of its solution in sulphuric acid is brownish yellow.

Example 24

9 parts of dimethyl-(4,14)-coeroxonol-(9) are stirred with 15 parts of stearoyl chloride and 4 parts of zinc dust in the presence of 50 parts of pyridine. The mixture thus becomes heated to from 70° to 80° C. After all the coeroxonol has passed into solution giving a yellow coloration, the resulting compound is precipitated from the filtered solution by means of aqueous alcohol. It may be freed from any stearic acid still adhering to it by treatment with alcohol. It dissolves readily in paraffin oil giving a yellow coloration and a yellow-green fluorescence.

Example 25

4.5 parts of coerulein are stirred with 5 parts of stearoyl chloride and 4 parts of zinc dust in the presence of 50 parts of pyridine. The mass thus becomes heated to about 70° C. As soon as almost all organic substances have passed into solution, the remainder of the zinc dust and the unchanged coerulein are filtered off and the compound formed is precipitated with alcohol. It dissolves in benzene giving an olive-yellow coloration and a green fluorescence.

A similar compound is obtained by heating coerulein with stearoyl chloride without further additions.

What we claim is:

1. An ester corresponding to the general formula (R—COO)$_n$—X, wherein R stands for the radical of a hydrocarbon containing at least 6 carbon atoms selected from the class consisting of aliphatic and cycloaliphatic hydrocarbons, X for a radical of the perylene series selected from the class consisting of perylene and a ketonic perylene, and $n$ for a whole number.

2. An ester corresponding to the general formula (R—COO)$_n$—X, wherein R stands for the radical of an aliphatic hydrocarbon containing at least 6 carbon atoms, X for a radical of the perylene series, and $n$ for a whole number.

3. An ester corresponding to the general formula (R—COO)$_n$—X, wherein R stands for the radical of an aliphatic hydrocarbon containing at least 6 carbon atoms, X for the radical of a ketonic perylene, and $n$ for a whole number.
4. The ester having the formula
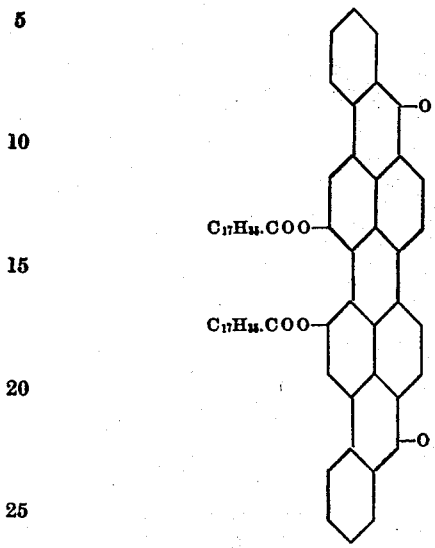
5. The ester having the formula
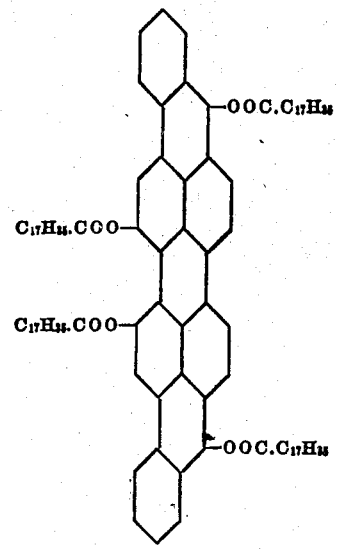
HEINRICH NERESHEIMER.
ANTON VILSMEIER.
KARL HEYMANN.